G. H. WIDNER.
CONTAINER FOR WATER SOFTENING OR FILTERING MATERIAL.
APPLICATION FILED JAN. 2, 1917.

1,223,460.

Patented Apr. 24, 1917.

Witnesses:
E. N. Broadhead.
G. R. Gauges

Inventor
George H. Widner
By Samuel Herrick
Attorney

UNITED STATES PATENT OFFICE.

GEORGE HENRY WIDNER, OF DES MOINES, IOWA.

CONTAINER FOR WATER SOFTENING OR FILTERING MATERIAL.

1,223,460.  Specification of Letters Patent.  Patented Apr. 24, 1917.

Application filed January 2, 1917. Serial No. 140,230.

*To all whom it may concern:*

Be it known that I, GEORGE HENRY WIDNER, a citizen of the United States of America, residing at Des Moines, in the county of Polk and State of Iowa, have invented certain new and useful Improvements in Containers for Water Softening or Filtering Material, of which the following is a specification.

This invention relates to containers for water softening or filtering material. It is well-known that it is highly desirable to, as far as possible, eliminate the washing or violent and disturbing effect upon the filtering material in filters or the water softening material in water softeners and that it is also highly desirable to equalize the flow as far as possible over the entire area of said material. It is, therefore, the primary object of the present invention to so construct a container of the type aforesaid that the flow of water will be evenly distributed and equalized over the entire area of the filter and the flow will be controlled in such manner that the violent disturbances of the material contained within the container will be prevented. The equalization of the flow prevents channeling and prevents some of the material from having to take care of more water than other parts of the material.

Figure 1:
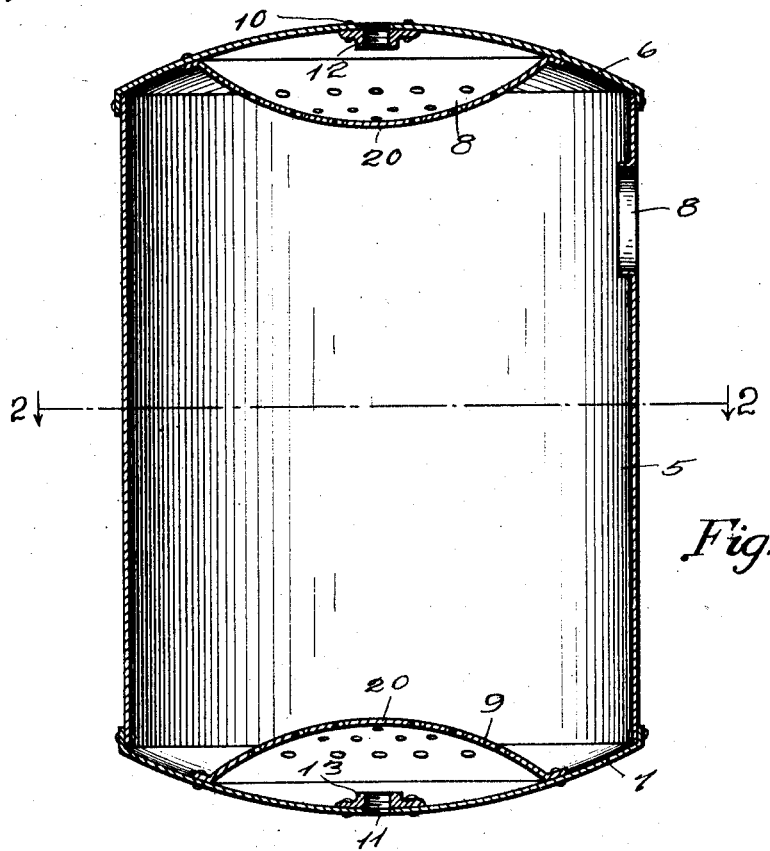
Figure 2:
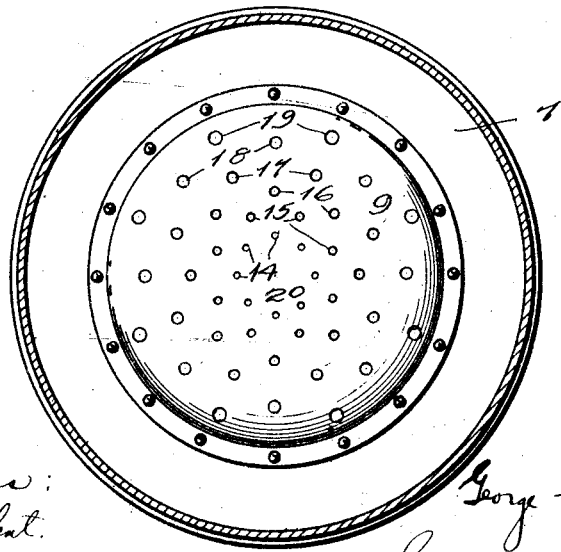

In the accompanying drawing:

Figure 1 is a vertical, sectional view of a container constructed in accordance with the invention, and Fig. 2 is a horizontal, sectional view therethrough.

In carrying out the invention I provide a container 5 having the heads 6 and 7 and having a man-hole opening 8 through which filtering or water softening material may be introduced into or removed from the container.

Secured to the ends or heads of the container are plates 8 and 9, here shown as of concavo-convex formation, though the particular shape of these plates may be varied. An inlet port 10 leads to the space inclosed within the plate 8 and an outlet port 11 leads from the space inclosed by the plate 9 and these ports are surrounded by suitable threaded flanges 12 and 13 adapted to receive inlet and outlet pipes, not shown.

The invention resides particularly in the construction of the plates 8 and 9 and their disposition with relation to the inlet and outlet ports and by referring to Fig. 2 of the drawing it will be seen that each of these plates is provided with a plurality of concentrically arranged rows of openings designated respectively, 14, 15, 16, 17, 18 and 19 and the openings constituting such rows are progressively larger from the center of the plate to the circumference thereof, said rows not only being concentric with relation to each other but being substantially concentric with relation to the plates within which they are formed. It will, therefore, be seen that an imperforate portion 20 of each of the plates lies in alinement with the inlet and outlet openings respectively and this imperforate portion receives the first force of the incoming stream through the inlet port 10 and acts as a baffle to break up the force of the incoming stream. The water is then caused to travel radially from said imperforate portion, and in all directions, and finds its way through the several rows of openings 14 to 19 into the body of the container and through the body of the material contained therein; the water passing through the openings in the plate 9 and out of the discharge port 11. Since the pressure is greatest in alinement with port 10 the openings 14 are made smaller than the openings 15, 16, 17, 18 and 19 and the area of the openings of the several rows is such that their area will be in direct proportion to the pressure existing at that point upon the plate in which they are formed so that an equalized flow will be secured over the entire area of said plate.

In other words, the volume of water that passes through one of the openings 14 in a given time will be equal to the volume of water that passes through one of the openings 19 in the same length of time. This is due to the fact that the increased area of port 19 with the water at a reduced pressure gives a flow equal to the flow through the much smaller openings 14 but with the water at a higher pressure at that point.

Even with an equal distribution of the water over the entire area of the material within the container, it is found that after a period of use this material becomes compacted to such an extent that the water finds its way more readily through some portions of the material than through others and it then becomes desirable to loosen up the body of the material to break up any channels that have formed therein and to permit the water to again evenly pass therethrough.

The formation of the channels aforesaid constitutes lines of least resistance to the flow of the "back-wash." The openings 14 to 19 are formed in the plates 8 and 9 when the plate is in its flat formation and consequently when these plates are brought to the concavo-convex formation illustrated in the drawing, the openings are disposed at such an angle as to direct the water from the outermost of said openings toward the sides of the containers. The angle of these openings in conjunction with their increased area gives such a volume of flow, despite the reduced pressure at that point over the entire bottom of the material as to bodily lift the entire body of material and thoroughly loosen the same.

Having described my invention what I claim is:—

1. In combination, a container, an inlet thereto, and a plate disposed between said inlet and the main body of the container and having a plurality of openings formed therein, the area of which is proportional to the pressure existing at the point where they are located.

2. In combination, a container, an inlet thereto, and a plate disposed between said inlet and the main body of the container and having a plurality of openings formed therethrough which successively increase in area from the center toward the circumference of said plate and said inlet being disposed to discharge upon the central portion of said plate.

3. In combination, a container, an inlet thereto, an outlet therefrom and plates disposed between the inlet and the outlet respectively and the body of the container each of said plates having a plurality of openings formed therethrough which increase progressively in area from the center to the circumference of said plates, said inlet being disposed to discharge centrally upon one of said plates.

4. In combination a container, an inlet located centrally at one end thereof, a plate disposed between said inlet and the main body of the container, said plate having an imperforate central portion disposed in alinement with the inlet and a plurality of annular rows of openings formed therein, the openings of the several rows progressively increasing in area from the center to the circumference of the plate and an outlet at the opposite end of the container whereby when the container is filled with material water may be passed through the bed of the material continuously and under pressure and the flow therethrough will be equalized by the difference in area of the openings of the several rows.

In testimony whereof I affix my signature in the presence of two witnesses.

GEORGE HENRY WIDNER.

Witnesses:
G. W. PRATHER,
E. E. MOORE.